United States Patent
Cho

(10) Patent No.: US 11,307,807 B2
(45) Date of Patent: Apr. 19, 2022

(54) MEMORY SYSTEM, MEMORY CONTROLLER, AND METHOD FOR OPERATING MEMORY SYSTEM FOR DETERMINING READ BIASES FOR READ RETRY OPERATION

(71) Applicant: SK hynix Inc., Gyeonggi-do (KR)

(72) Inventor: Chan Hyeok Cho, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/941,828

(22) Filed: Jul. 29, 2020

(65) Prior Publication Data
US 2021/0279000 A1 Sep. 9, 2021

(30) Foreign Application Priority Data
Mar. 9, 2020 (KR) .................. 10-2020-0028860

(51) Int. Cl.
G06F 3/06 (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0673; G06F 3/0604
See application file for complete search history.

(56) References Cited

U.S. PATENT DOCUMENTS

| | | | |
|---|---|---|---|
| 2007/0064543 A1* | 3/2007 | Iwasaki | G11B 11/10515 369/13.14 |
| 2016/0180946 A1* | 6/2016 | Hong | G11C 29/76 365/185.11 |
| 2017/0154657 A1* | 6/2017 | Kim | G11C 29/52 |
| 2020/0027503 A1* | 1/2020 | Chen | G11C 16/28 |
| 2020/0218661 A1* | 7/2020 | Ryu | G06F 12/0246 |
| 2021/0098034 A1* | 4/2021 | Mantegazza | G11C 13/004 |
| 2021/0255781 A1* | 8/2021 | Chae | G06F 3/0613 |

FOREIGN PATENT DOCUMENTS

| KR | 10-2017-0062254 | 6/2017 |
|---|---|---|
| KR | 10-2017-0065076 | 6/2017 |

\* cited by examiner

*Primary Examiner* — Sean D Rossiter
(74) *Attorney, Agent, or Firm* — IP & T Group LLP

(57) ABSTRACT

A memory system may perform a first read retry operation using at least one read bias of multiple read biases in a priority read bias group, among a plurality of read biases; and perform, according to a result of the first read retry operation, a second read retry operation using one or more remaining read biases, not in the priority read bias group, in the read retry table. At this time, the read biases in the priority read bias group may be selected prior to the remaining read biases when performing the read retry operation on the target memory area. As a result, the memory system is able to minimize degradation of reading performance due to the read retry operation and reduce the number of unnecessary reads when performing the read retry operation.

18 Claims, 17 Drawing Sheets

1st read retry operation

2nd read retry operation

MEMORY SYSTEM, MEMORY CONTROLLER, AND METHOD FOR OPERATING MEMORY SYSTEM FOR DETERMINING READ BIASES FOR READ RETRY OPERATION

CROSS REFERENCE TO RELATED APPLICATION

The present application claims priority under 35 U.S.C. § 119(a) to Korean patent application number 10-2020-0028860, filed on Mar. 9, 2020, which is incorporated herein by reference in its entirety.

BACKGROUND

1. Field of the Invention

Embodiments of the present disclosure relate to a memory system, a memory controller, and a method for operating a memory system.

2. Description of the Prior Art

A memory system, e.g., a storage device is configured to store data on the basis of a request from a host, such as a computer, a mobile terminal (for example, a smartphone or a tablet), or any of various other electronic devices. The memory system may be of a type configured to store data in a magnetic disk such as a hard disk drive (HDD), or of a type configured to store data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

The memory system may perform a read retry operation when the read operation failed due to deterioration of the threshold voltage distribution in the process of reading (or attempting to read) data in the memory device. When performing a read retry operation, the memory system may perform the read retry operation after changing a read bias for reading data.

SUMMARY

Embodiments of the present disclosure may provide a memory system, a memory controller, and a method of operating a memory system capable of minimizing degradation of reading performance due to a read retry operation in the situation in which the threshold voltage distribution deteriorates.

In addition, embodiments of the present disclosure may provide a memory system, a memory controller, and a method of operating a memory system capable of reducing the number of unnecessary reads during a read retry operation.

In an aspect, embodiments of the present disclosure may provide a memory system that includes a memory device including a plurality of memory areas and a memory controller configured to control the memory device.

When performing a read retry operation on a target memory area of the plurality of memory areas, the memory controller may perform a first read retry operation on a target memory area using at least one read bias of multiple read biases in apriority read bias group, among a plurality of read biases in a read retry table.

The memory controller may perform a second read retry operation on the target memory area, according to the result of the first read retry operation, using one or more remaining read biases, not in the priority read bias group, in the read retry table.

At this time, the read bias in the priority read bias group may be selected prior to the remaining read biases when performing the read retry operation on the target memory area.

The memory controller may control the memory device to perform a first read retry operation until reading data from a target memory area succeeds using one of the read biases in the priority read bias group or until reading of data from a target memory area fails for all read biases in the priority read bias group.

For example, when performing a first read retry operation, a first read bias may be selected on the basis of the time at which reading of data from any one of a plurality of memory areas succeeded.

As another example, when performing a first read retry operation, a first read bias may be selected on the basis of the number of times reading data from any one of a plurality of memory areas succeeded during a set time period.

The memory controller may update information about the priority read bias group on the basis of at least one of the results of the first read retry operation and the second read retry operation.

In the second read retry operation, the memory controller may add a second read bias to the priority read bias group when the reading data from the target memory area succeeds on the basis of the second read bias among the remaining read biases.

In this case, when the number of read biases in the priority read bias group exceeds a threshold number of read biases, the memory controller may evict one sacrificial read bias, among the read biases included in the priority read bias group, from the priority read bias group.

For example, the sacrificial read bias may be selected on the basis of the time at which reading data from any one of a plurality of memory areas succeeded.

As another example, the sacrificial read bias may be selected on the basis of the number of times reading data from any one of a plurality of memory areas succeeded during a set time period.

In another aspect, embodiments of the present disclosure may provide a memory controller that includes a memory interface for communicating with a memory device including a plurality of memory areas and a control circuit configured to control the memory device.

When performing a read retry operation on a target memory area among a plurality of memory areas, the control circuit may perform a first read retry operation on the target memory area at least one read bias of multiple read biases in the priority read bias group among a plurality of read biases in a read retry table.

The control circuit may perform, according to the result of the first read retry operation, a second read retry operation on the target memory area using one or more remaining read biases, not in the priority read bias group, in the read retry table.

At this time, the read bias in the priority read bias group may be selected prior to the remaining read biases when performing the read retry operation on the target memory area.

The control circuit may control the memory device to perform a first read retry operation until reading data from a target memory area succeeds using one of the read biases in the priority read bias group or until reading of data from a target memory area fails for all read biases in the priority read bias group.

For example, when performing a first read retry operation, a first read bias may be selected on the basis of the time at which reading data from any one of a plurality of memory areas succeeds.

As another example, when performing a first read retry operation, a first read bias may be selected on the basis of the number of times reading data from any one of a plurality of memory areas succeeded during a set time period.

The control circuit may update information about the priority read bias group on the basis of at least one of the results of the first read retry operation and the second read retry operation.

When the reading data from the target memory area succeeds using a second read bias among the remaining read biases when performing the second read retry operation, the control circuit may add the second read bias to the priority read bias group.

In this case, when the number of read biases in the priority read bias group exceeds a threshold number of read biases, the control circuit may evict one sacrificial read bias from the priority read bias group.

For example, the sacrificial read bias may be selected on the basis of the time at which reading data from any one of a plurality of memory areas succeeded.

As another example, the sacrificial read bias may be selected on the basis of the number of times reading data from any one of a plurality of memory areas succeeded during a set time period.

A method of operating a memory system may include a step of performing a first read retry operation on a target memory area at least one read bias of multiple read biases in a priority read bias group, among a plurality of read biases in a read retry table.

The method of operating the memory system may include a step of further performing a second read retry operation on the target memory area, according to the result of the first read retry operation, using one or more the remaining read biases, not in the priority read bias group, in the read retry table.

The read bias in the priority read bias group may be selected prior to the remaining read biases when performing the read retry operation on the target memory area.

For example, the performing of a first read retry operation may include selecting a first read bias on the basis of the time at which reading data from any one of a plurality of memory areas succeeded.

As another example, the performing of a first read retry operation may include selecting a first read bias on the basis of the number of times reading data from any one of a plurality of memory areas succeeded during a set time period.

The method of operating the memory system may further include a step of updating information about the priority read bias group on the basis of at least one of the results of the first read retry operation and the second read retry operation.

In another aspect, embodiments of the present disclosure may provide an operating method of a controller.

The operating method may include controlling a memory device to perform a priority read retry operation on a storage area sequentially using one or more priority read biases in a group within a read retry table according to one of a most recent success scheme and a most successful scheme.

The operating method may include controlling a memory device to perform, when the priority read retry operation fails, a normal read retry operation on the storage area using a normal read bias within the read retry table.

The operating method may include moving, when the normal read retry operation is successful, the normal read bias to the group.

The moving may include moving, when the group is full of existing priority read biases, one of the existing priority read biases out of the group according to one of a least recent success scheme and a least successful scheme.

According to embodiments of the present disclosure, it is possible to minimize degradation of reading performance due to a read retry operation in the situation in which the threshold voltage distribution deteriorates.

In addition, according to embodiments of the present disclosure, it is possible to reduce the number of unnecessary reads during the read retry operation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
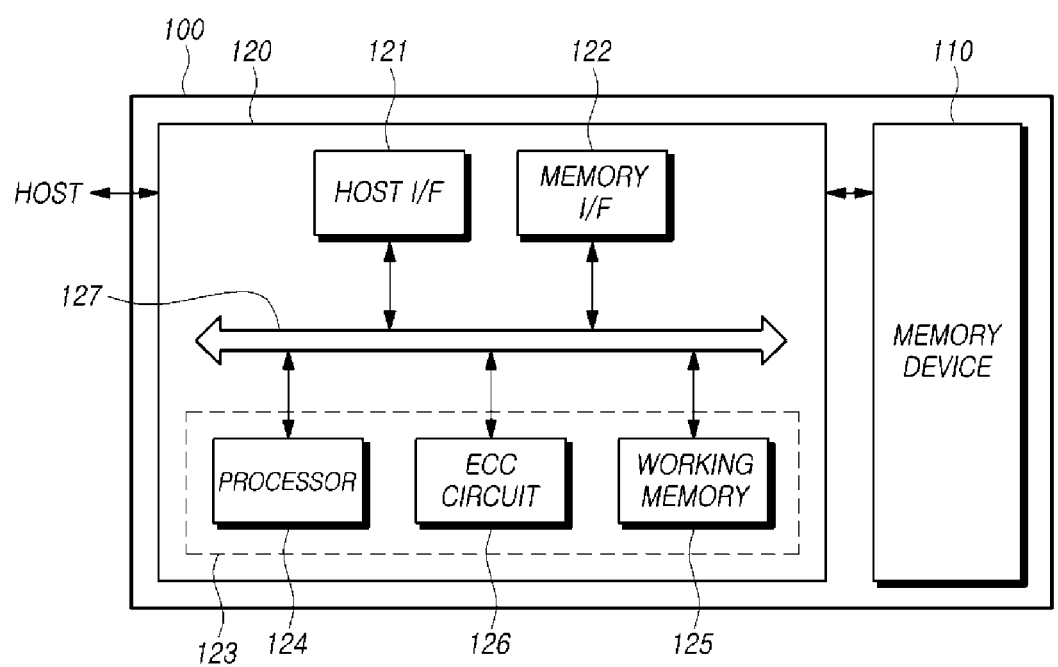
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), and an erasure (erase) operation.

The memory device 110 may include a memory cell array including multiple memory cells (also simply referred to as "cells") configured to store data. The memory cell array may exist inside a memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 in the absence of a request of the host, such as, for example, when it performs one or more background operations of the memory device 110.

The memory controller 120 and the host may be separate devices. In another embodiment, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for overall control of the memory controller 120. For example, the control circuit 123 may include a processor 124 and a working memory 125. The control circuit 123 may further include an error detection/correction circuit (ECC circuit) 126 and the like.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include a flash translation layer (FTL) configured to translate between a logical address that the host requests the memory system 100 to provide and a physical address of the memory device 110, a host interface layer (HIL) configured to interpret a command that the host issues to the memory system 100 (storage device) and to deliver the same to the FTL, and/or a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect an error bit of target data using an error correction code, and to correct the detected error bit. For example, the target data may be data stored in the working memory 125, or data retrieved from the memory device 110.

The error detection/correction circuit 126 may be implemented to decode data using the error correction code. The error detection/correction circuit 126 may be implemented using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of the above-mentioned constituent elements may be omitted, and/or one or more of such elements may be integrated into a single element. Also, in some cases, one or more other constituent elements may be added, in addition to the above-mentioned constituent elements of the memory controller 120.

Hereinafter, the memory device 110 is described in more detail with reference to FIG. 2.

Figure 2:
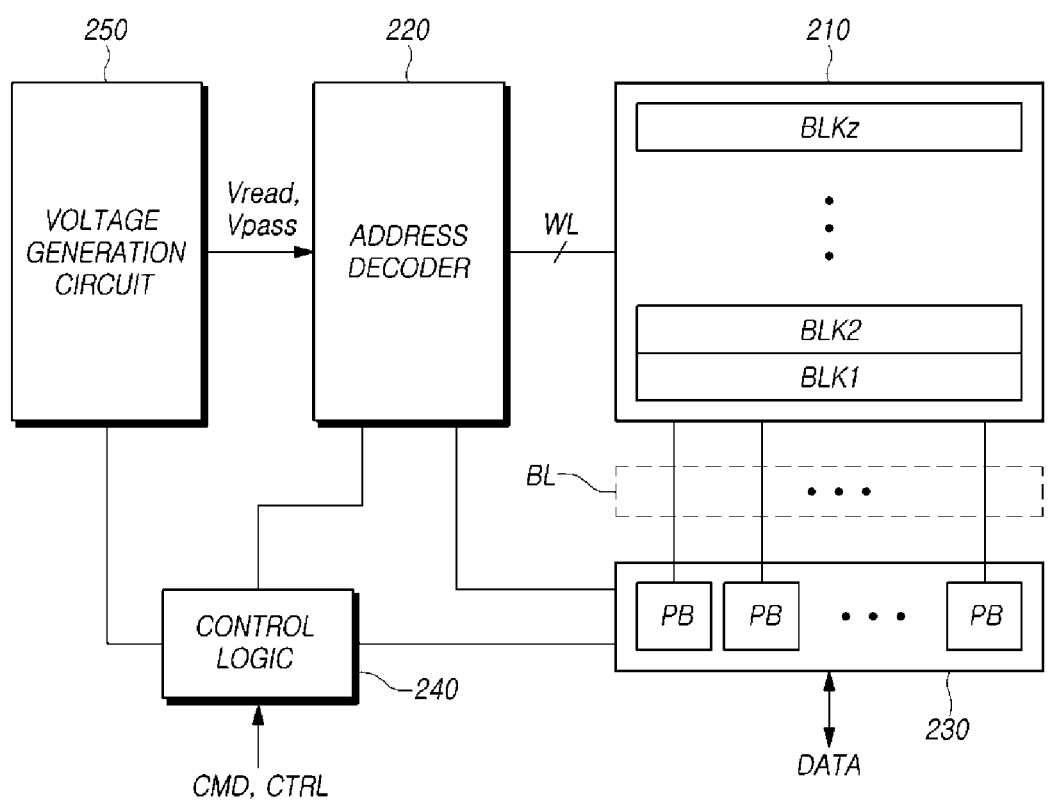
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read/write circuit 230, control logic 240, and a voltage generation circuit 250.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, or a triple-level cell (TLC) configured to store three bits of data. As another example, each of the multiple memory cells in the memory cell array 210 may be a quad-level cell (QLC) configured to store four bits of data. As another example, the memory cell array 210 may include multiple memory cells, each of which may be configured to store at least five bits of data.

Referring to FIG. 2, the address decoder 220, the read/write circuit 230, the control logic 240, and the voltage generation circuit 250 may cooperatively operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block, and may apply the pass voltage Vpass to the remaining non-selected word lines WL.

During a program verification operation, the address decoder 220 may apply a verification voltage generated by the voltage generation circuit 250 to a selected word line WL inside a selected memory block, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that participates in a data processing function and, in some cases, may further include a cache buffer that participates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
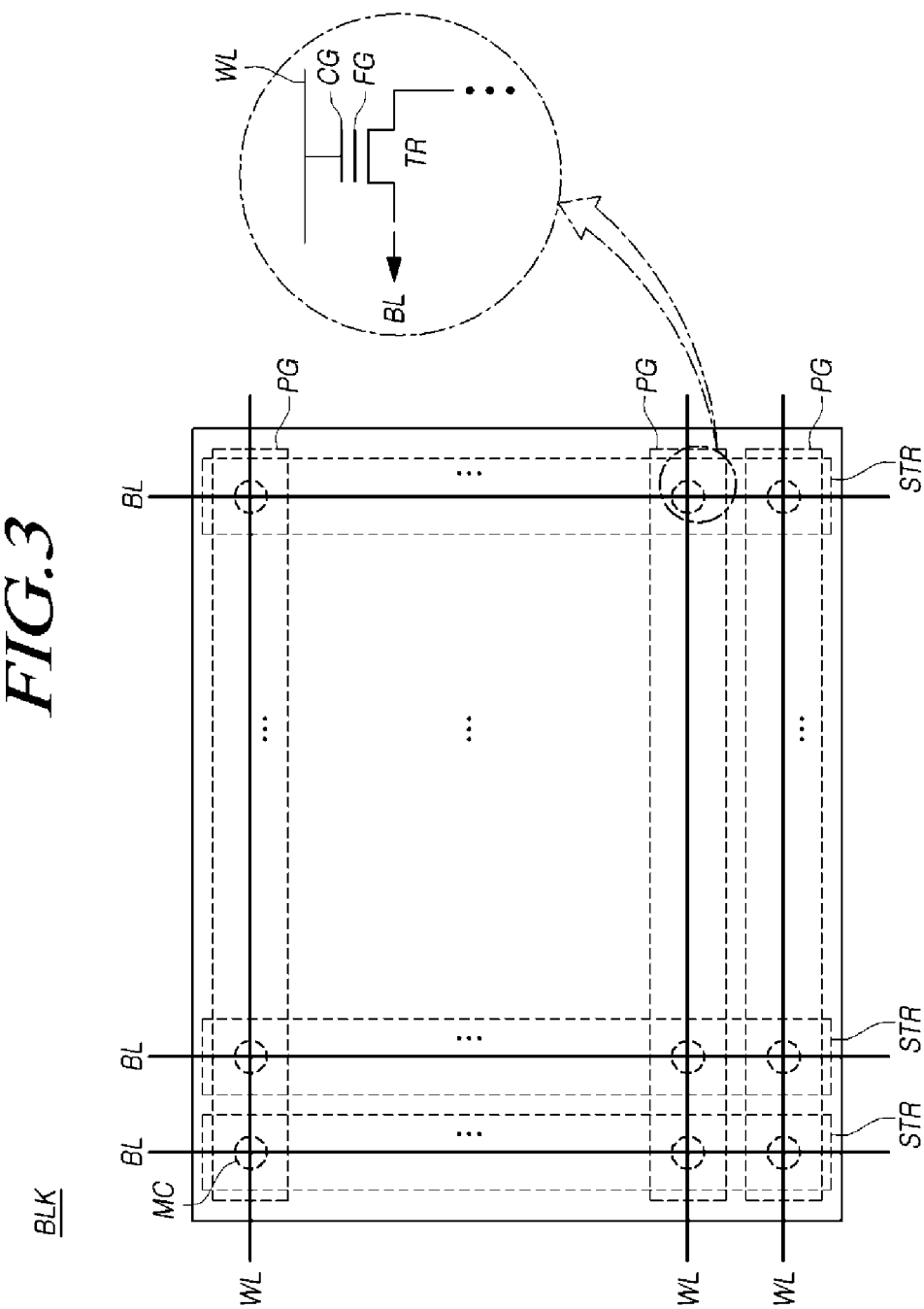
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, a memory block BLK may be arranged and configured such that multiple pages PG and multiple strings STR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
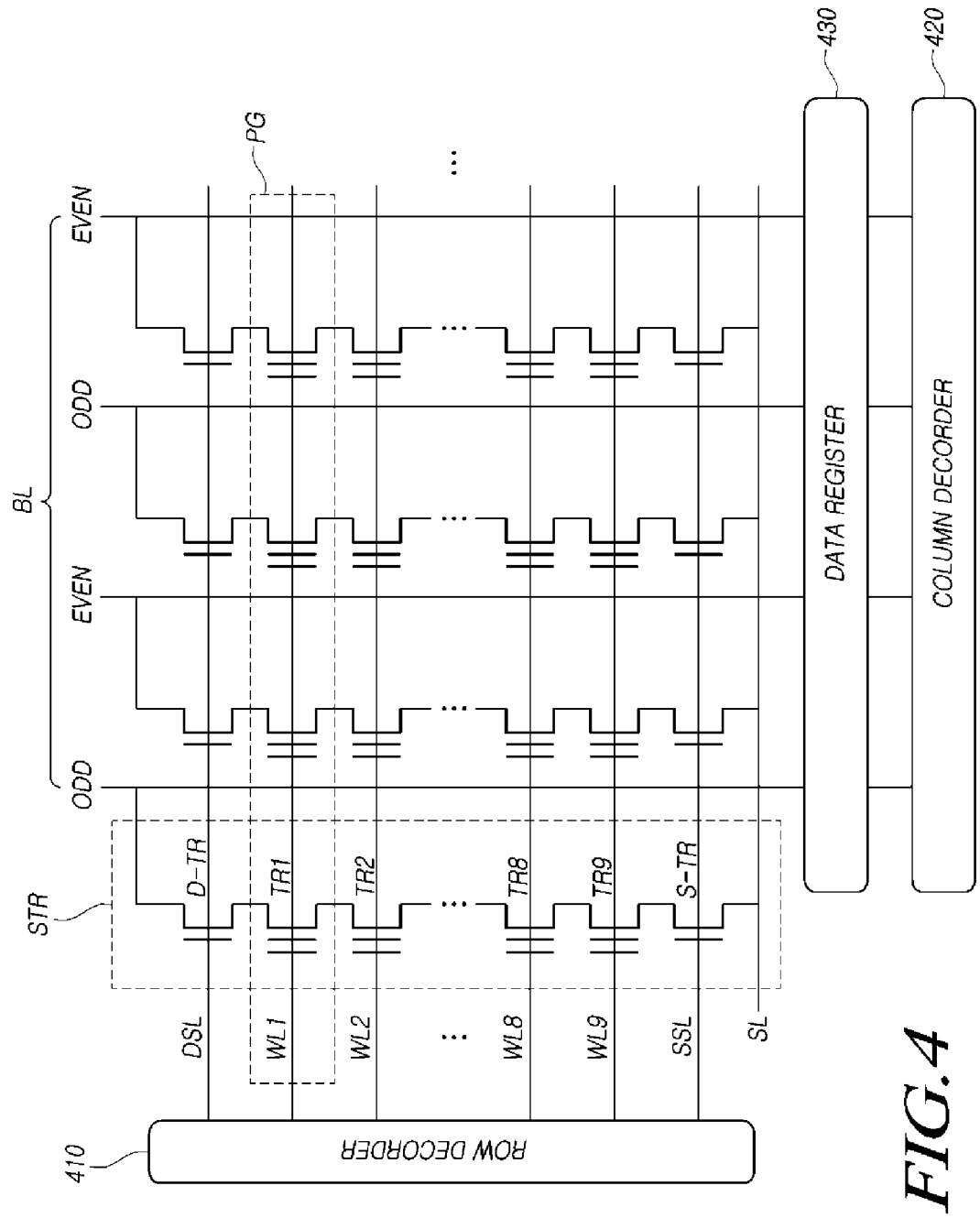
FIG. 4 is a diagram illustrating a structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420. Among the bit lines BL, odd-numbered bit lines BL are distinguished from even-numbered bit lines BL.

For accessing a memory cell MC, the address may be entered to the core area first through the input/output end and then through the row decoder 410 and the column decoder 420 such that a corresponding target memory cell can be designated. As used herein, designating a target memory cell refers to accessing one of the memory cells MC at a site of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade overall performance of the memory device 110.

Referring to the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role of the first selection transistor D-TR and that of the second selection transistor S-TR may be evicted, and electrons may operate only between the floating gate FG and the substrate due to the potential difference.

Figure 5:
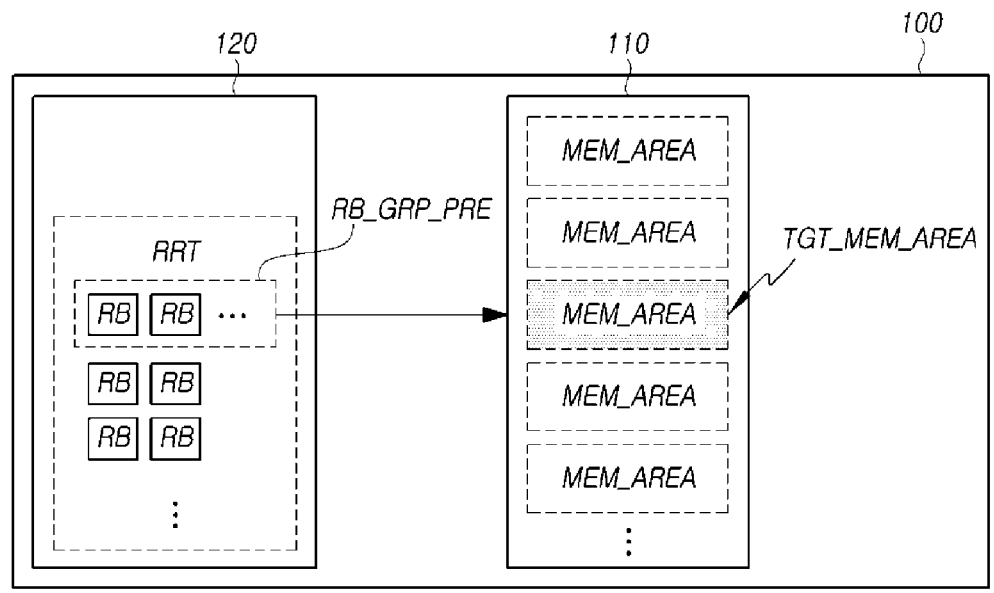
FIG. 5 is a diagram illustrating an example in which a memory system performs a first read retry operation according to an embodiment of the present disclosure.

FIG. 5 is a diagram illustrating an example in which a memory system 100 performs a first read retry operation according to an embodiment of the present disclosure.

Referring to FIG. 5, a memory device 110 of the memory system 100 may include a plurality of memory areas, each denoted as MEM_AREA. The size of each of the plurality of memory areas may be fixed (e.g., a memory block or a page).

The memory controller 120 of the memory system 100 may perform a read retry operation on one of the memory areas (target memory area denoted TGT_MEM_AREA in FIG. 5), among the plurality of memory areas. If reading data from the target memory area fails, that is, if an error occurs while reading data from the target memory area, the memory controller 120 may perform a read retry operation in order to read error-free data from the target memory area.

The memory controller 120 may control the memory device 110 to perform a read retry operation on the target memory area on the basis of a read retry table RRT. The read retry table may include a plurality of read bias values, and the memory controller 120 may control the memory device 110 to repeat an operation of reading data from the target memory area using one of a plurality of read bias values in the read retry table.

In this case, as the number of read operations performed on the target memory area increases, the time for reading data from the target memory area may also increase, thereby deteriorating read performance of the memory system 100. In particular, in the case where a higher storage capacity memory cell, such as TLC/QLC or the like is used in the memory device 110, the number of threshold voltages for reading data from one memory cell increases, which increases the size of the read retry table. The number of times a read operation for the same data is performed on the target memory area also increases, so that the reading performance of the memory system 100 may significantly deteriorate.

Therefore, when performing a read retry operation on the target memory area, the memory system 100 needs to minimize the number of times that the read retry operation is performed on the target memory area.

Deterioration of the threshold voltage distribution due to stress and other factors may occur similarly in all memory areas in the memory device 110. That is, deterioration is not limited to a specific memory area or even a subset of all memory areas of the memory device 110. Therefore, it is more likely that at least one read bias to successfully read data when performing the read retry operation on any one memory area is included among the read biases in the read bias table.

If the memory system 100 selects such specific read bias(es) as a priority read bias group RB_GRP_PRE and performs a read retry operation first with the read bias(es) in the priority read bias group, it is possible to minimize the number of times the memory system 100 performs the read retry operation on the target memory area.

Therefore, when performing a read retry operation on the target memory area, the memory controller 120 of the memory system 100 may control the memory device 110 to perform a first read retry operation on the target memory area by using the read bias(es) in the priority read bias group, among all read biases in the read retry table. In illustrated example of FIG. 5, when performing the read retry operation on the target memory area, the read biases in the priority read bias group may be selected before the other read biases within the read retry table.

Figure 6:
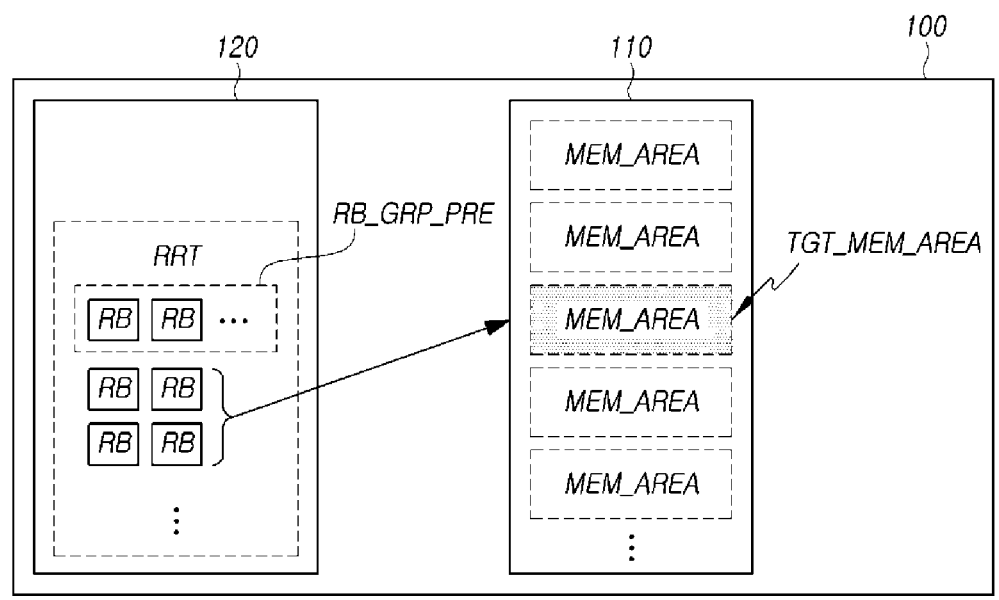
FIG. 6 is a diagram illustrating an example in which a memory system performs a second read retry operation according to an embodiment of the present disclosure.

FIG. 6 is a diagram illustrating an example in which a memory system 100 performs a second read retry operation according to an embodiment of the present disclosure.

Referring to FIG. 6, as a result of a first read retry operation using the read biases from the RB_GRP_PRE having failed, the memory controller 120 of the memory system 100 may control a memory device 110 to perform a second read retry operation on the target memory area on the basis of the remaining read biases, i.e., the read biases not in the priority read bias group, within the read retry table. It is noted that the second read retry operation is not necessary when the first read retry operation succeeds. In that case, the memory controller 120 may control the memory device 110 to not perform the second read retry operation. However, when the first read retry operation fails, the memory controller 120 may control the memory device 110 to perform the second read retry operation.

An example in which the memory system 100 configures the priority read bias group RB_GRP_PRE from among a plurality of read biases in the read retry table RRT is described with reference to FIG. 7 below.

Figure 7:
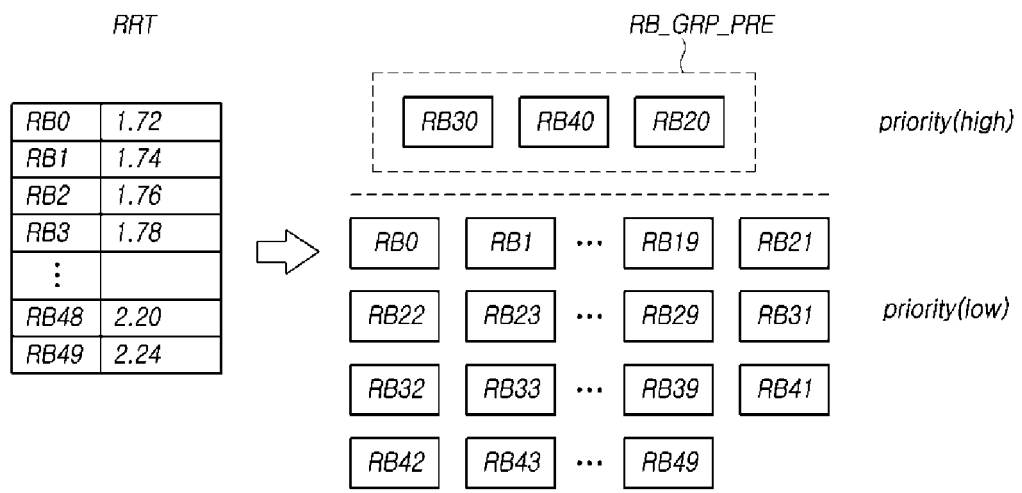
FIG. 7 is a diagram illustrating an example in which a memory system generates a priority read bias group according to an embodiment of the present disclosure.

FIG. 7 is a diagram illustrating an example in which a memory system 100 according to embodiments of the present disclosure generates a priority read bias group RB_GRP_PRE.

In FIG. 7, a read retry table RRT includes 50 read biases RB0 to RB49. However, the number of read bias values included in the read retry table RRT is not limited to a any specific number; according to embodiments of the present disclosure, the read retry table may include any suitable number of read bias values.

A memory controller 120 of the memory system 100 may generate a priority read bias group RB_GRP_PRE that includes at least one of read biases RB0 to RB49 in the read retry table RRT. In the example of FIG. 7, the priority read bias group may include three read biases RB30, RB40, and RB20. As is the case with the total number of read biases in the read retry table, the number of read biases in the priority read bias group is not limited to any specific number.

The memory controller 120 of the memory system 100 may manage the priority read bias group through any of various types of data structures. For example, the memory controller 120 may manage the priority read bias group using a data structure such as queues, lists, arrays, and the like.

The memory controller 120 may manage the priority read bias group such that the number of read biases in the priority read bias group is less than or equal to a threshold number of read biases (e.g., three). Other thresholds may be used consistent with the teachings herein.

When performing a read retry operation, the memory controller 120 may first select the read biases RB30, RB40, and RB20 in the priority read bias group. That is, RB30, RB40 and RB20 are selected with a higher priority than the other read biases that are not in the priority read bias group.

Hereafter, an example in which the memory system 100 performs a read retry operation on the target memory area first using the read biases in the priority read bias group and then using the remaining read biases that are not included in the priority read bias group RB_GRP_PRE is described with reference to the flowchart in FIG. 8.

Figure 8:
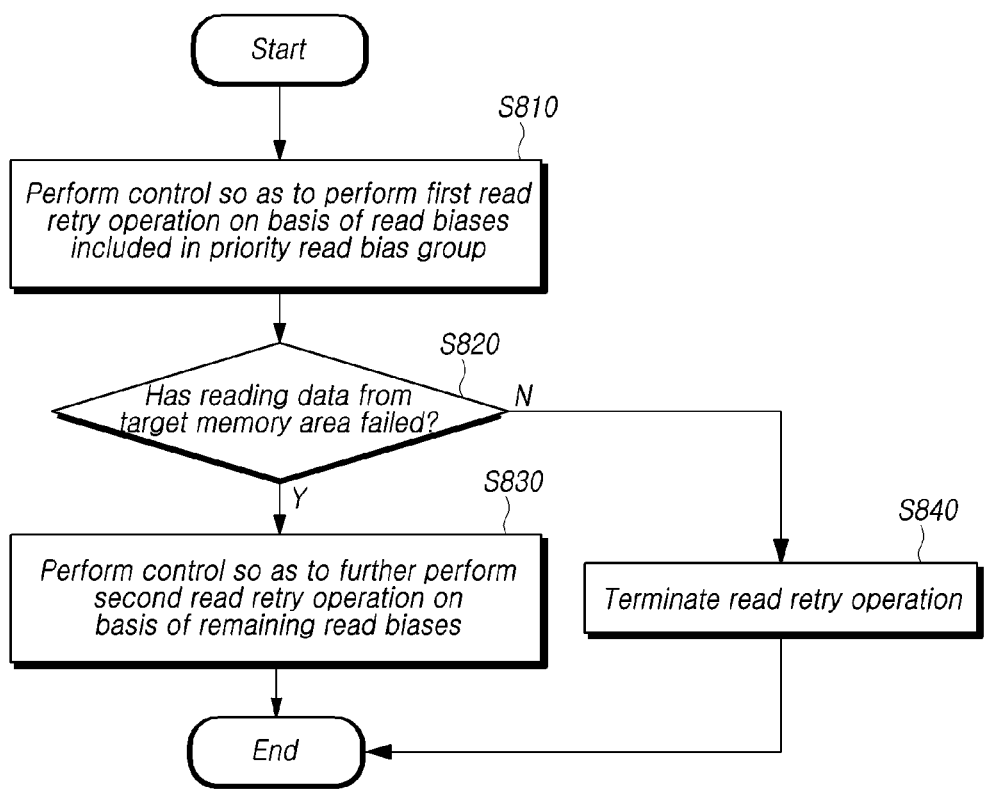
FIG. 8 is a flowchart illustrating an example in which a memory system performs a read retry operation on a target memory area according to an embodiment of the present disclosure.

FIG. 8 is a flowchart illustrating an example in which a memory system 100 performs a read retry operation on a target memory area.

First, a memory controller 120 of the memory system 100 may control the memory device 110 to perform a first read retry operation on a target memory area using the read bias(es) in the priority read bias group, among a plurality of read biases in a read retry table RRT (S810). In this case, the memory controller 120 may output, to the memory device 110, a command, data, or a signal instructing the memory device 110 to perform the first read retry operation.

Additional detail pertaining to step S810 is described with reference to FIG. 9.

Thereafter, depending on the result of the first read retry operation in step S810, the memory controller 120 may control the memory device 110 to perform a second read retry operation on the target memory area on the basis of the remaining read biases, i.e., read biases not in the priority read bias group but within the read retry table.

Specifically, the memory controller 120 may determine whether or not reading data from the target memory area in the first read retry operation has failed (S820).

If the reading of data from the target memory area has failed (S820-Y), the memory controller 120 may control the memory device 110 to further perform a second read retry operation on the target memory area TGT_MEM_AREA on the basis of the remaining read biases (S830). In this case, the memory controller 120 may output, to the memory device 110, a command, data, or a signal instructing the memory device 110 to perform the second read retry operation.

On the other hand, if the reading of data from the target memory area has succeeded (S820-N), the memory controller 120 may not perform the second read retry operation on the target memory area, and instead may terminate the read retry operation (S840).

Figure 9:
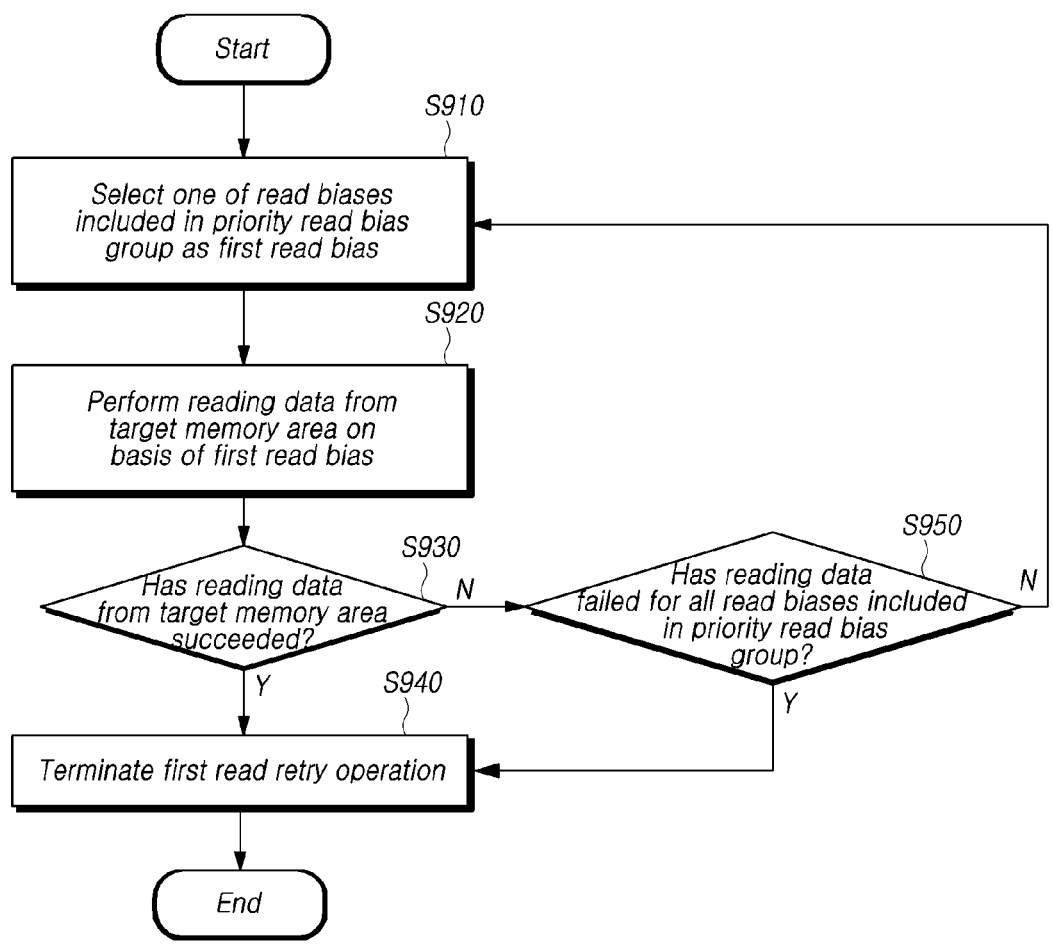
FIG. 9 is a flowchart illustrating an example in which a memory system performs a first read retry operation on a target memory area according to an embodiment of the present disclosure.

FIG. 9 is a flowchart illustrating an example in which a memory system 100 performs a first read retry operation on a target memory area according to an embodiment of the present disclosure.

First, a memory controller 120 of the memory system 100 may select one of the read biases in the priority read bias group as a first read bias (S910).

Then, the memory controller 120 may control the memory device 110 to perform a data read operation on the target memory area using the first read bias (S920).

In addition, the memory controller 120 determines whether or not the read operation performed on the target memory area has succeeded in step S920 (S930).

If the reading of data from the target memory area has succeeded (S930-Y), the memory controller 120 terminates the first read retry operation (S940).

On the other hand, if reading of data from the target memory area has failed (S930-N), the memory controller 120 may determine whether or not the failure is with respect to all read biases in the priority read bias group (S950).

If the reading of data has failed with respect to all of the read biases in the priority read bias group (S950-Y), the memory controller 120 terminates the first read retry operation. Thereafter, the memory controller 120 may control the memory device 110 to perform a second read retry operation.

On the other hand, if there is still one or more untried read biases in the priority read bias group (S950-N), the memory controller 120 may select one of the read biases in the priority read bias group that has not yet been tried.

In other words, the memory controller 120 may select read biases from the priority read bias group, one-by-one, and control the memory device 110 to perform the first read retry operation using the selected read bias until data is either successfully read from the target memory area or all read biases in the priority read bias group have been tried.

The criteria used by the memory controller 120 to select the first read bias to apply in reading data from the target memory area, from among all read biases in the priority read bias group, may be determined in any of various ways in step S910.

Hereinafter, an example of criteria for selecting the first read bias is described with reference to FIGS. 10 and 11.

Figure 10:
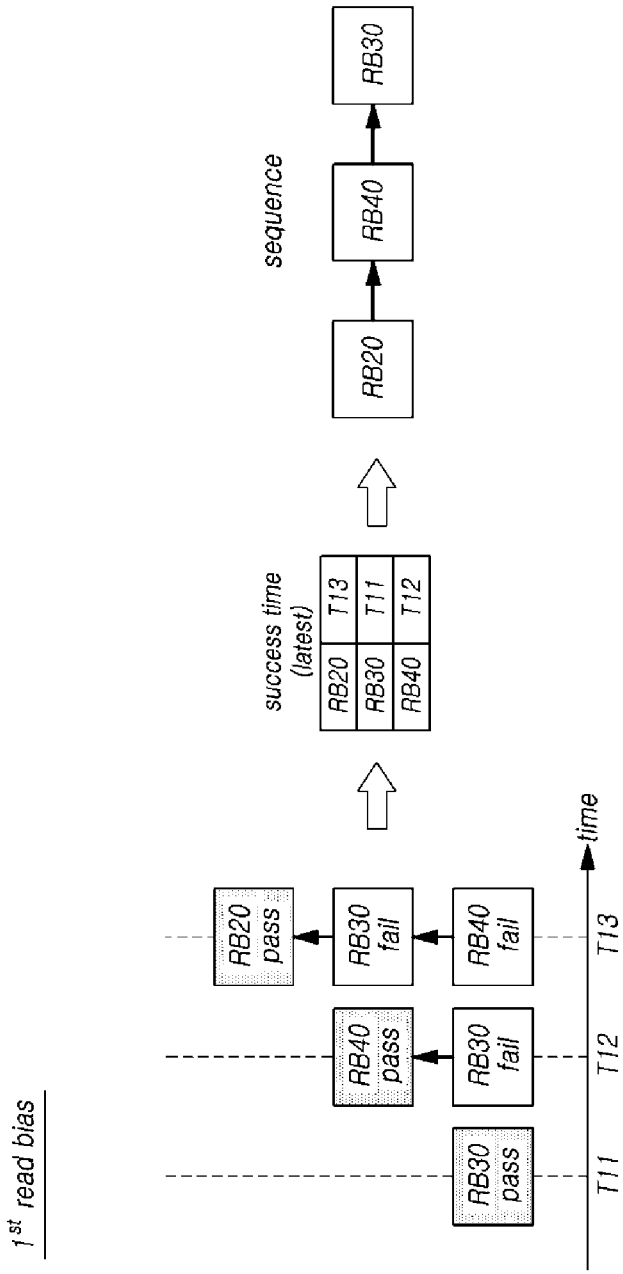
FIG. 10 is a diagram illustrating an example of criteria for selecting a first read bias in a memory system according to an embodiment of the present disclosure.

FIG. 10 is a diagram illustrating an example of criteria for selecting a first read bias in a memory system 100 according to an embodiment of the present disclosure.

For example, the first read bias may be selected on the basis of the time at which reading data from any one of a plurality of memory areas succeeds (passes). For example, the read bias that has most recently succeeded (passed) in reading data from any one of a plurality of memory areas may be selected as the first read bias for a memory area that is the target of the current read operation.

In FIG. 10, it is assumed that the priority read bias group RB_GRP_PRE includes read bias RB30, read bias RB40, and read bias RB20.

In this case, it is assumed that reading data from any one of a plurality of memory areas has succeeded using read bias RB30 at time T11.

In addition, it is assumed that reading of data from any one of a plurality of memory areas has failed using read bias RB30 and has succeeded using read bias RB40 at time T12.

In addition, it is assumed that, at time T13, reading data from any one of a plurality of memory areas has failed using read bias RB40 and read bias RB30, and has succeeded using read bias RB20.

In this case, time T13 is more recent than time T11 and time T12. Accordingly, read bias RB20, which was successful at T13, i.e., is the most recently successful read bias, may be preferentially selected as the first read bias for reading data from the target memory area from among read biases RB20, RB30, and RB40.

If the reading of data from the target memory area using read bias RB20 has failed, read bias RB40 may be selected next for reading data from the target memory area. This is due to the fact that time T12, at which the reading of data from a memory area succeeded using read bias RB40, is more recent than time T11, at which the reading of data from a memory area succeeded using read bias RB30. RB30 is applied if the reading of data from the target memory area using RB40 fails.

The above-described scheme of ordering the read biases in the priority read bias group for application in a read operation on the target memory area is referred to as a most recent success scheme.

Figure 11:
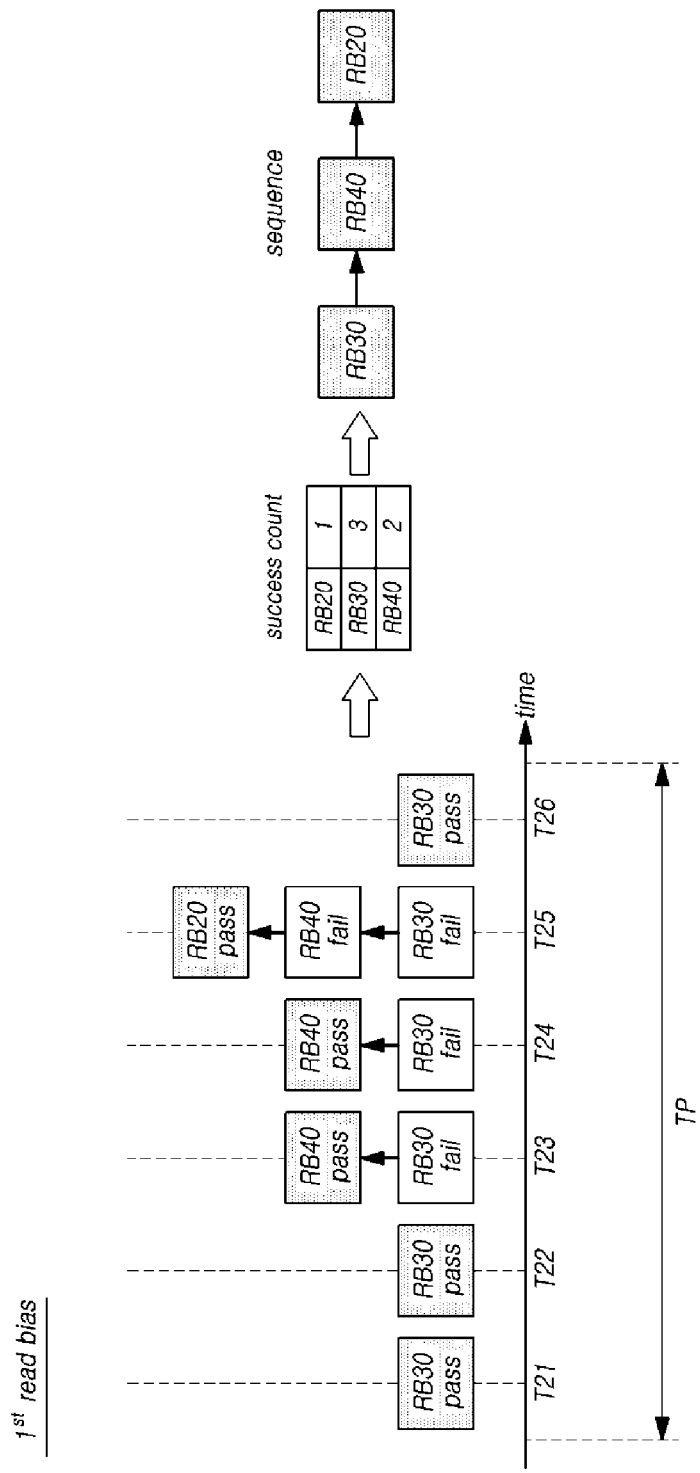
FIG. 11 is a diagram illustrating another example of criteria for selecting a first read bias in a memory system according to an embodiment of the present disclosure.

FIG. 11 is a diagram illustrating another example of criteria for selecting a first read bias in a memory system 100 according to an embodiment of the present disclosure.

As another example, the first read bias may be selected on the basis of the number of times a read bias is used to successfully read data from any one of a plurality of memory areas in a set time period. For example, the read bias yielding the highest number of successful data reads from any the memory areas during a set time period may be selected as the first read bias.

Referring to FIG. 11, the memory controller 120 may count the number of times each of the read biases in the priority read bias group is used to successfully read data from any one of the memory areas in the memory device 110 during a set time period TP.

In FIG. 11, it is assumed that the priority read bias group includes read bias RB30, read bias RB40, and read bias RB20.

As shown in FIG. 11, data was successfully read from a memory area using read bias RB30 at time T21.

In addition, data was successfully read from a memory area using read bias RB30 at time T22.

In addition, data was unsuccessfully read from a memory area using read bias RB30 and successfully read from a memory area using read bias RB40 at time T23.

Still further, at time T24 RB30 yielded an unsuccessful data read and RB40 yielded a successful data read.

At time T25 three data reads were attempted. The data read using RB20 was successful while data reads using each of RB30 and RB40 failed.

Finally, data was successfully read from a memory area using read bias RB30 at time T26.

Compiling the results, it can be seen that read bias RB30 yielded three successful data reads during the time period TP, read bias RB40 yielded two and read bias RB20 yielded one. Accordingly, read bias RB30 may be preferentially selected as the first read bias for reading data from the target memory area.

In this case, if the reading of data from the target memory area fails using read bias RB30, the read bias RB40 may be selected next for reading data from the target memory area. This is because RB40 produced more successful data reads than read bias RB20 during the time period TP.

The above-described scheme of ordering the read biases in the priority read bias group for application in a read operation on the target memory area is referred to as a most successful scheme.

As described above, the memory controller 120 may further perform a second read retry operation on the target memory area depending on the result of the first read retry operation. That is, if all of the read biases in the priority read bias group are tried and none yield a successful data read, the memory controller 120 may then perform a second read retry operation using a read bias not in the priority read bias group.

The memory controller 120 may update information on the priority read bias group to reflect the results of the first read retry operation and the second read retry operation if performed.

For example, for each read bias in the priority read bias group, the memory controller 120 may update information on the time at which the reading of data from any one of a plurality of memory areas in the memory device 110 succeeds using that read bias.

As another example, for each read bias in the priority read bias group, the memory controller 120 may update information on the number of times reading of data from any one of a plurality of memory areas in the memory device 110 succeeds using that read bias.

As another example, if reading data from the target memory area TGT_MEM_AREA succeeds using any of the remaining read biases not in the priority read bias group but within the read retry table RRT when performing the second read retry operation, the memory controller 120 may add that read bias to the priority read bias group.

Specifically, the memory controller 120 may control the memory device 110 to perform the second read retry operation after reading of data from the target memory area TGT_MEM_AREA fails for all read biases in the priority read bias group.

In addition, when reading of data from the target memory area succeeds using a second read bias among the remaining read biases within the read retry table RRT when performing the second read retry operation, the memory controller 120 may add the second read bias to the priority read bias group.

Figure 12:
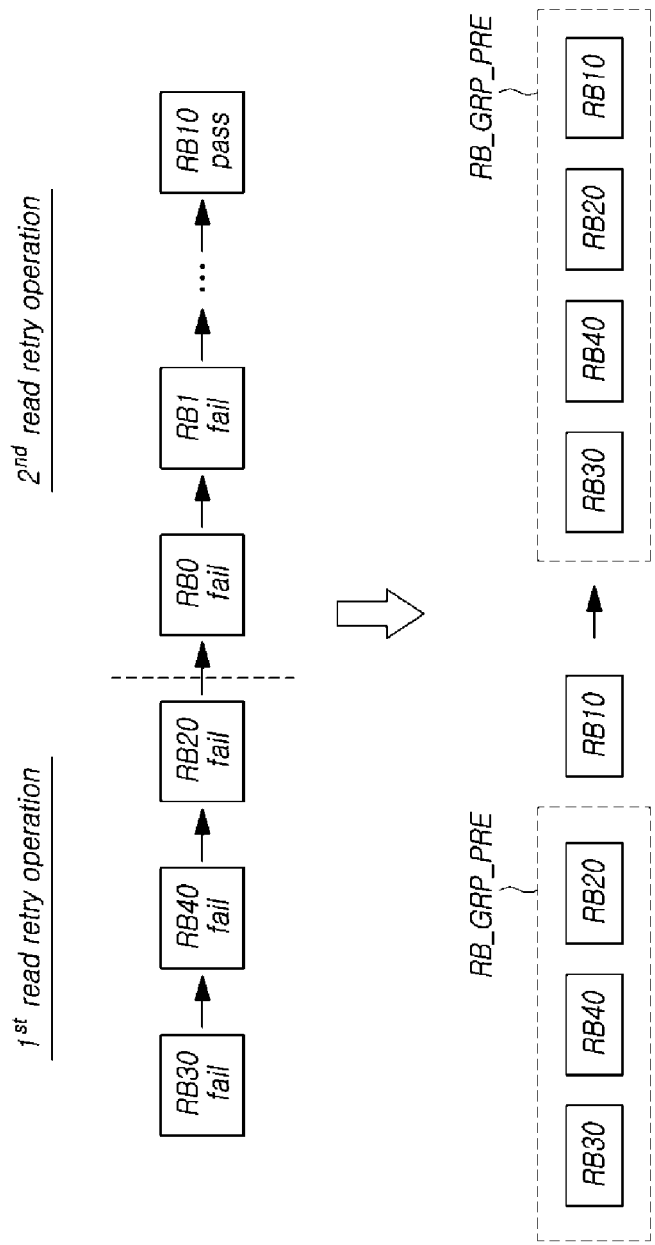
FIG. 12 is a diagram illustrating an example in which a memory system adds a new read bias to a priority read bias group according to an embodiment of the present disclosure.

FIG. 12 is a diagram illustrating an example in which a memory system 100 adds a new read bias to a priority read bias group according to an embodiment of the present invention.

In FIG. 12, it is assumed that reading of data from the target memory area has failed for all read biases RB30, RB40, and RB20 in the priority read bias group when performing a first read retry operation.

Thereafter, as shown in FIG. 12, two read biases (RB0 and RB1) not included in the priority read bias group are tried in respective second read retry operations. As shown, neither read operation is successful. A third read bias (RB10) from outside the priority read bias group is used to successfully read data from the target memory area. As a result of that success, RB10 is added to the priority read bias group.

In the course of adding new read biases to the priority read bias group, the number of read biases in such group is monitored to avoid having too many read biases in the priority read bias group. That is, if the number of read biases in the priority read bias group exceeds a threshold number of read biases after adding another read bias to the group, the memory controller 120 may evict one sacrificial read bias among the read biases in the priority read bias group from the group.

Figure 13:
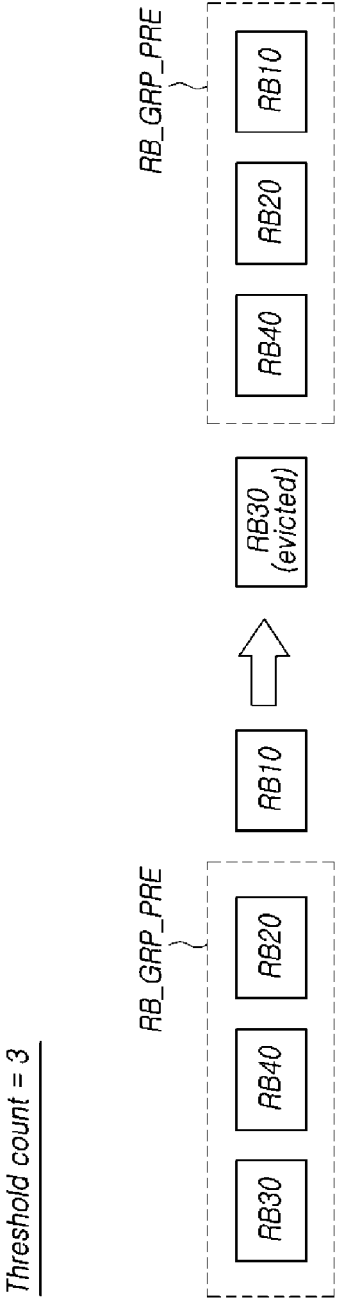
FIG. 13 is a diagram illustrating an example in which a memory system evicts one sacrificial read bias from a priority read bias group according to an embodiment of the present disclosure.

FIG. 13 is a diagram illustrating an example in which a memory system 100 evicts one sacrificial read bias from a priority read bias group according to an embodiment of the present disclosure.

The threshold number of read biases in the example of FIG. 13 is three. If read bias RB10 is newly added to the priority read bias group, the number of read biases in the priority read bias group becomes four, which exceeds the threshold number of read biases, i.e., three in this example. Accordingly, the memory controller 120 may select any one of the read biases RB30, RB40, and RB20 in the priority read bias group as a sacrificial read bias, and may evict the same from the group. For example, in FIG. 13, read bias RB30 is selected as a sacrificial read bias.

Hereinafter, criteria for selecting a sacrificial read bias is described with reference to FIGS. 14 and 15.

Figure 14:
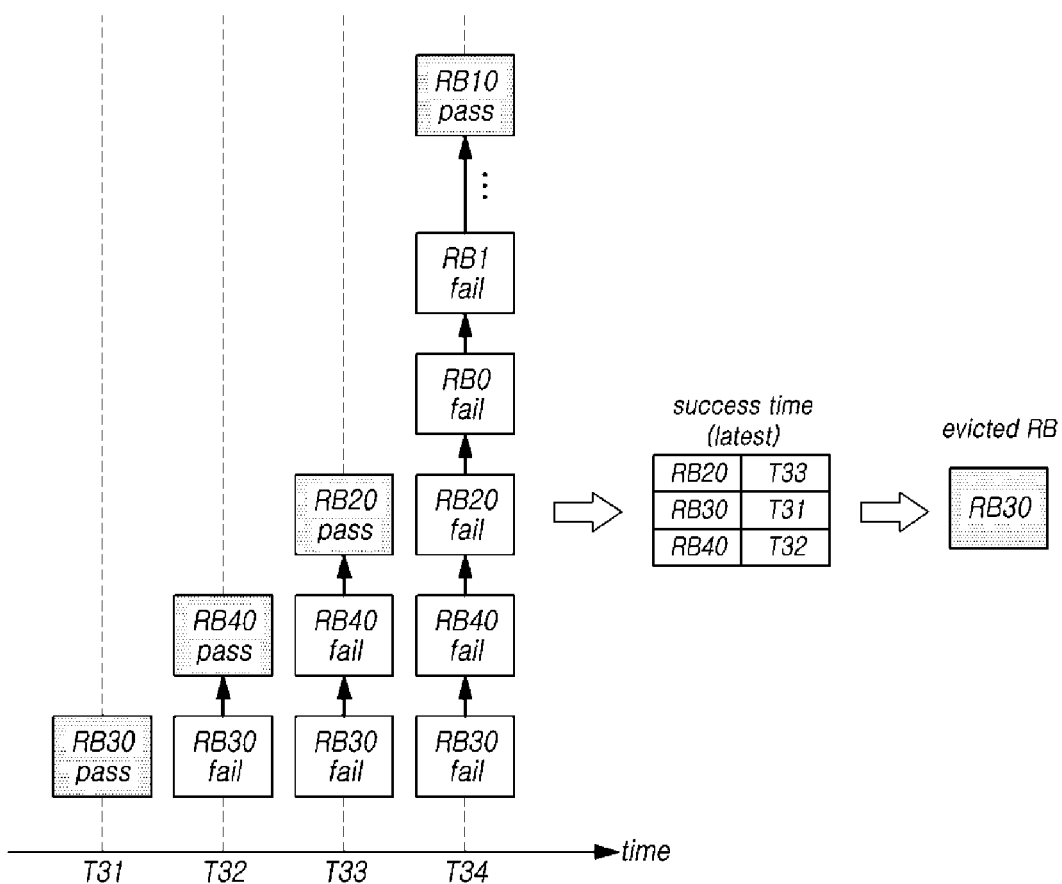
FIG. 14 is a diagram illustrating an example of criteria for selecting a sacrificial read bias in a memory system according to an embodiment of the present disclosure.

FIG. 14 is a diagram illustrating an example of criteria for selecting a sacrificial read bias in a memory system 100 according to an embodiment of the present disclosure.

For example, the sacrificial read bias may be selected on the basis of the time at which reading of data from any one of a plurality of memory areas succeeds. For example, a read bias that succeeds in reading data from any one of a plurality of memory areas at the earliest time may be selected as the sacrificial read bias.

In FIG. 14, it is assumed that read biases RB30, RB40, and RB20 are in the priority read bias group.

In this case, it is assumed that reading of data from any one of a plurality of memory areas succeeded using read bias RB30 at time T31.

In addition, it is assumed that reading of data from any one of a plurality of memory areas failed using read bias RB30 and succeeded using read bias RB40 at time T32.

In addition, it is assumed that reading of data from any one of a plurality of memory areas failed using read bias RB40 and read bias RB30, and succeeded using read bias RB20 at time T33.

Further, it is assumed that reading of data from any one of a plurality of memory areas failed using read bias RB30, read bias RB40, read bias RB20, read bias RB0, and read bias RB1, and succeeded using read bias RB10 at time T34.

In this case, time T31 is the earliest of the multiple reading times, and RB30 was used at that time to successfully read data from a memory area. Accordingly, read bias RB30 may be selected as a sacrificial read bias.

The above-described scheme of evicting the earliest successful read bias from the priority read bias group is referred to as a least recent success scheme.

Figure 15:
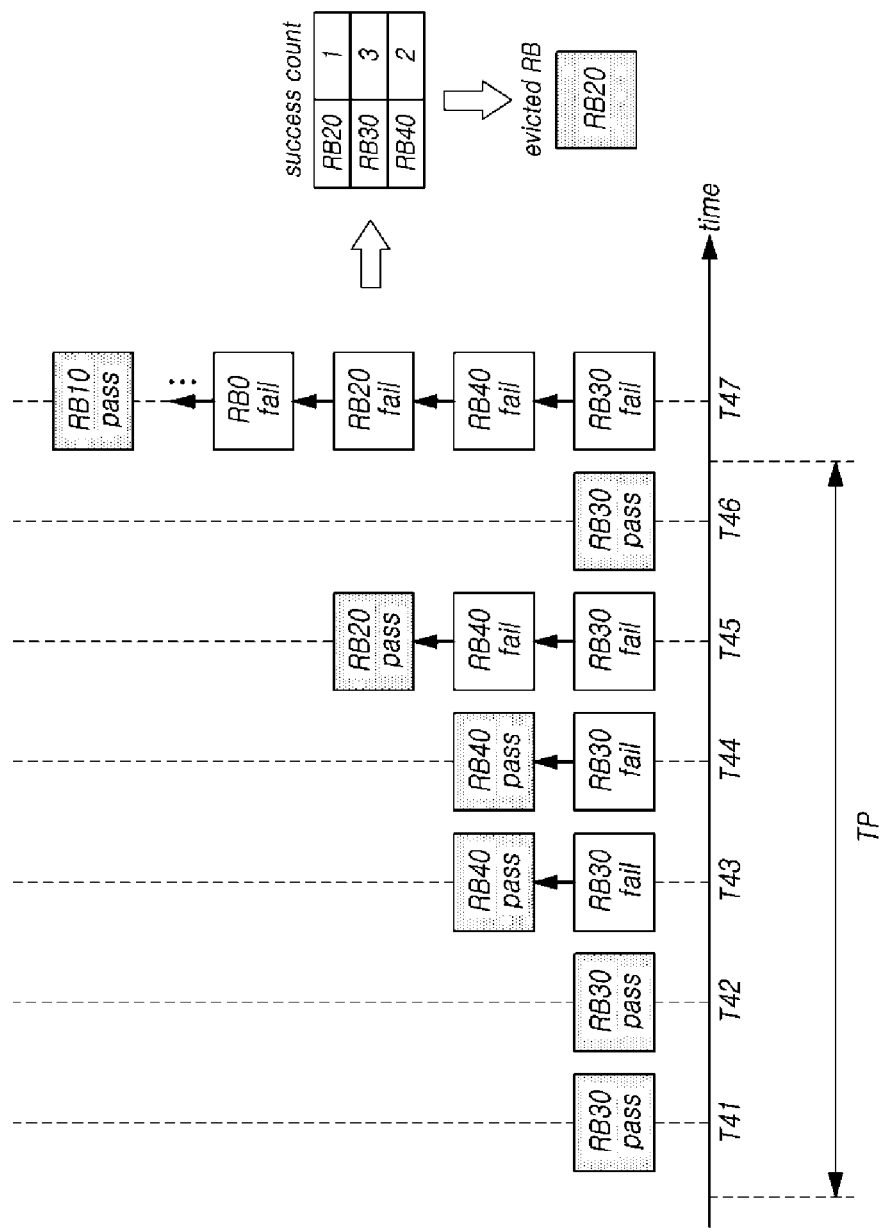
FIG. 15 is a diagram illustrating another example of criteria for selecting a sacrificial read bias in a memory system according to an embodiment of the present disclosure.

FIG. 15 is a diagram illustrating another example of criteria for selecting a sacrificial read bias in a memory system 100 according to an embodiment of the present disclosure.

As another example, the sacrificial read bias may be selected on the basis of the number of times reading of data from any one of a plurality of memory areas succeeds during a set time period.

In FIG. 15, it is assumed that the priority read bias group includes read biases RB20, RB30 and RB40.

In this case, it is assumed that reading of data from any one of a plurality of memory areas succeeded using read bias RB30 at time T41.

In addition, it is assumed that reading of data from any one of a plurality of memory areas succeeded using read bias RB30 at time T42.

In addition, it is assumed that reading of data from any one of a plurality of memory areas failed using read bias RB30 and succeeded using read bias RB40 at time T43.

In addition, it is assumed that reading of data from any one of a plurality of memory areas failed using read bias RB30 and succeeded using read bias RB40 at time T44.

In addition, it is assumed that reading of data from any one of a plurality of memory areas failed using read bias RB30 and read bias RB40, and succeeded using read bias RB20 at time T45.

Further, it is assumed that reading data from any one of a plurality of memory areas failed using read bias RB30, read bias RB40, read bias RB20, and read bias RB0, and succeeded using read bias RB10 at time T46.

In this case, during the time period TP, of all the read biases used, read bias RB30 was the most successful, resulting in three successful reads, whereas read bias RB20 was the least successful, resulting in only one successful read. Accordingly, read bias RB20 may be selected as a sacrificial read bias.

The above-described scheme of evicting a read bias from the priority read bias group is referred to as a least successful scheme.

Figure 16:
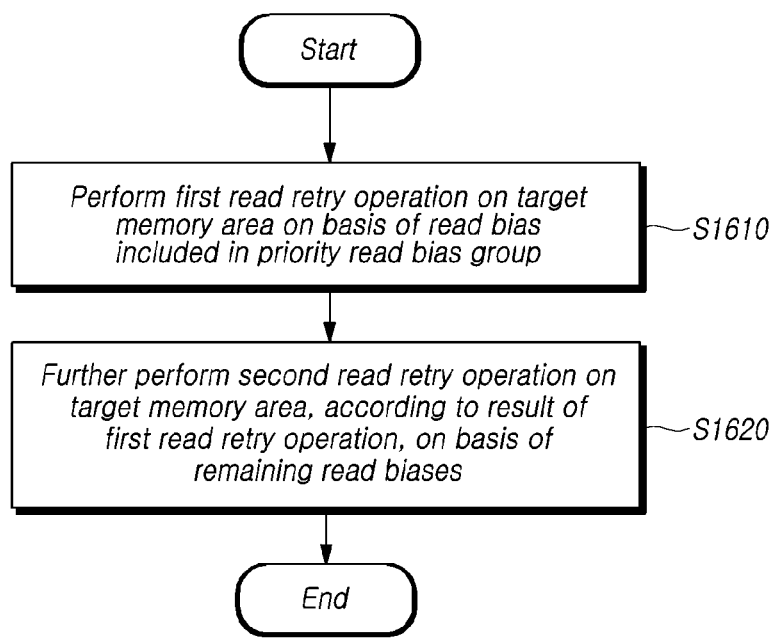
FIG. 16 is a flowchart illustrating a method of operating a memory system according to an embodiment of the present disclosure.

FIG. 16 is a flowchart illustrating a method of operating a memory system 100 according to an embodiment of the present disclosure.

A method of operating the memory system 100 may include a step of performing a first read retry operation on the target memory area TGT_MEM_AREA on the basis of, e.g., using, a read bias in the priority read bias group, among a plurality of read biases in a read retry table RRT (S1610). The read biases in the priority read bias group may be selected prior to the remaining read biases that are not included in the priority read bias group when performing the read retry operation on the target memory area.

In this case, the first read retry operation may be performed until reading of data from the target memory area TGT_MEM_AREA succeeds using one of the read biases in the priority read bias group RB_GRP_PRE or until all of the read biases in the priority read bias group are tried but none result in successfully reading data from the target memory area.

For example, when performing the first read retry operation, a first read bias may be selected on the basis of the time at which the reading data from any one of a plurality of memory areas succeeded.

As another example, when performing the first read retry operation, a first read bias may be selected on the basis of the number of times reading of data from any one of a plurality of memory areas succeeded during a set time period.

In addition, the method of operating the memory system 100 may include a step of performing a second read retry operation on the target memory area depending on the result of the first read retry operation. The second read retry operation, if performed, is done using one or more read biases not in the priority read bias group (S1620).

The second read retry operation may be performed after all read biases in the priority read bias group are tried but none result in successfully reading data from the target memory area.

In addition to steps S1610 and S1620 described above, the method of operating the memory system 100 may further include a step of updating information on the priority read bias group on the basis of the results of the first read retry operation, and also based on the second read retry operation if performed.

For example, when performing the second read retry operation, if the reading of data from the target memory area succeeds using a read bias among the remaining read biases that are not included in the priority read bias group, the that read bias may be added to the priority read bias group.

In addition, if the number of read biases in the priority read bias group exceeds a threshold number of read biases, one sacrificial read bias among the read biases in the priority read bias group may be evicted from the group.

For example, the sacrificial read bias may be selected on the basis of the time at which the reading of data from any one of a plurality of memory areas succeeded.

As another example, the sacrificial read bias may be selected on the basis of the number of times the reading of data from any one of a plurality of memory areas succeeded during a set time period.

The operation of the memory controller 120 described above may be controlled by the control circuit 123 in such a manner that the processor 124 performs (drives) firmware that is programmed to control overall operation of the memory controller 120.

Figure 17:
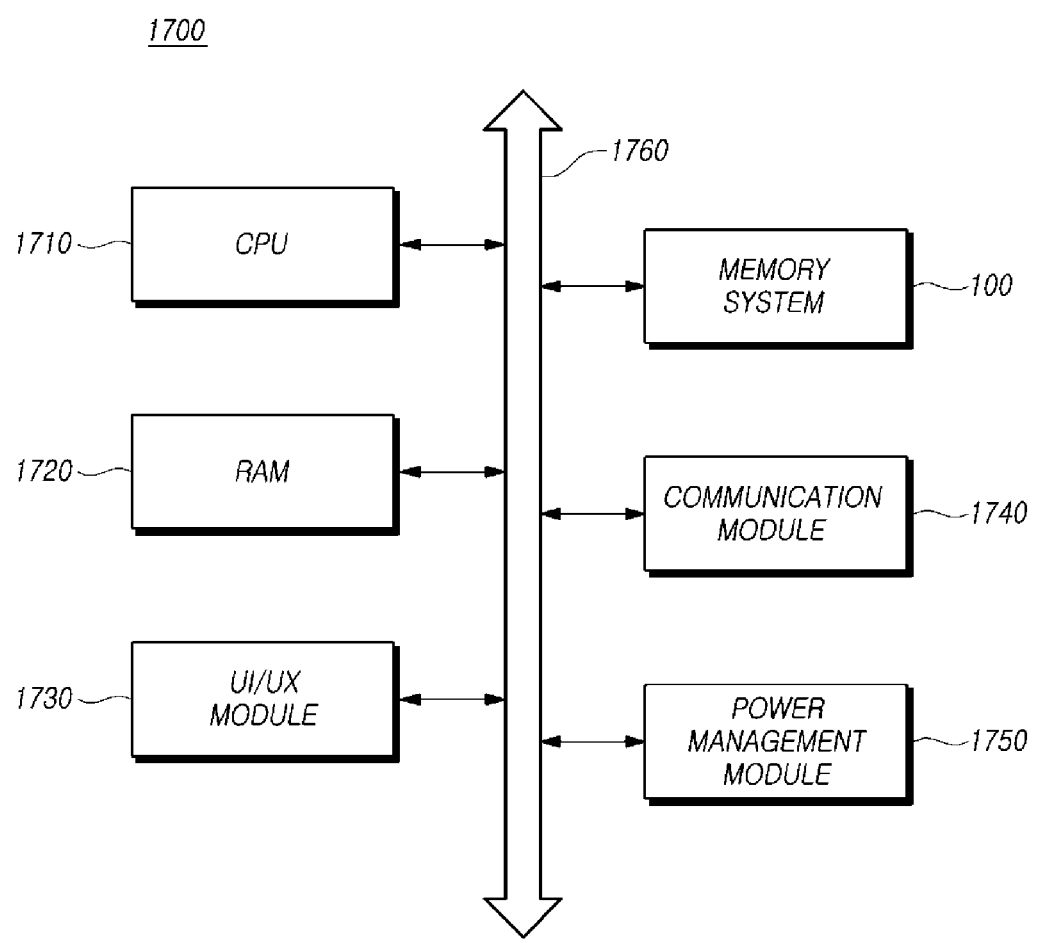
FIG. 17 is a diagram illustrating a configuration of a computing system according to an embodiment of the present disclosure.

FIG. 17 is a diagram illustrating the configuration of a computing system 1700 according to an embodiment of the present disclosure.

Referring to FIG. 17, the computing system 1700 may include: a memory system 100 electrically connected to a system bus 1760; a central processing unit (CPU) 1710 configured to control overall operation of the computing system 1700; a random access memory (RAM) 1720 configured to store data and information related to operations of the computing system 1700; a user interface/user experience (UI/UX) module 1730 configured to provide the user with a user environment; a communication module 1740 configured to communicate with an external device in a wired and/or wireless type; and a power management module 1750 configured to manage power used by the computing system 1700.

The computing system 1700 may be a personal computer (PC) or may include a mobile terminal such as a smartphone, a tablet or any of various other electronic devices.

The computing system 1700 may further include a battery for supplying an operating voltage, an application chipset, a graphic-related module, a camera image processor, and a dynamic RAM (DRAM). As those skilled in the art will understand, the computing system 1700 may include other elements as well.

The memory system 100 may be implemented as a device configured to store data in a magnetic disk such as a hard disk drive (HDD), or a device configured to store data in a nonvolatile memory such as a solid state drive (SSD), a universal flash storage device, or an embedded MMC (eMMC) device. Examples of a non-volatile memory include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various types of storage devices, any of which may be mounted inside any of a wide variety of electronic devices.

According to embodiments of the present disclosure described above, the operation delay time of the memory system may be minimized. In addition, according to an embodiment of the present disclosure, an overhead occurring in the process of calling a specific function may be minimized. Although various embodiments of the present disclosure has been illustrated and described, those skilled in the art will appreciate that various modifications, additions and substitutions are possible, without departing from the scope and spirit of the disclosure as disclosed in the accompanying claims. Therefore, embodiments of the present disclosure have been described to enable those skilled in the art to practice the invention, not to limit it. The present encompasses all variations and modifications that fall within the scope of the claims.

What is claimed is:

1. A memory system comprising:
   a memory device comprising a plurality of memory areas; and
   a memory controller configured to control, when performing a read retry operation on a target memory area of the plurality of memory areas, the memory device to:
   perform a first read retry operation on the target memory area using at least one read bias of multiple read biases in a priority read bias group, among a plurality of read biases in a read retry table; and
   perform, according to a result of the first read retry operation, a second read retry operation on the target memory area using one or more remaining read biases, not in the priority read bias group, in the read retry table,
   wherein the read biases in the priority read bias group are selected prior to the remaining read biases when performing the read retry operation on the target memory area, and
   wherein, when performing the first read retry operation, a first read bias in a priority read bias group, used for the first read retry operation, is selected on the basis of the number of times reading data from any one of a plurality of memory areas succeeded during a set time period.

2. The memory system of claim 1, wherein the memory controller is configured to control the memory device to perform the first read retry operation until reading data from the target memory area succeeds using one of the read biases in the priority read bias group or until reading of data from the target memory area fails for all read biases in the priority read bias group.

3. The memory system of claim 1, wherein when performing the first read retry operation, the first read bias is selected on the basis of a time at which reading of data from any one of the plurality of memory areas succeeded.

4. The memory system of claim 1, wherein the memory controller is configured to update information on the priority read bias group on the basis of at least one of results of the first read retry operation and the second read retry operation.

5. The memory system of claim 4, wherein the memory controller is configured to, when reading data from the target memory area succeeds using a second read bias of the remaining read biases when performing the second read retry operation, add the second read bias to the priority read bias group.

6. The memory system of claim 5, wherein the memory controller is configured to, when the number of read biases in the priority read bias group exceeds a threshold number of read biases, evict one sacrificial read bias from the priority read bias group.

7. The memory system of claim 6, wherein the sacrificial read bias is selected on the basis of a time at which reading data from any one of the plurality of memory areas succeeded.

8. The memory system of claim 6, wherein the sacrificial read bias is selected on the basis of the number of times reading data from any one of the plurality of memory areas succeeded during a set time period.

9. A memory controller comprising:
   a memory interface configured to communicate with a memory device comprising a plurality of memory areas; and
   a control circuit configured to control, when performing a read retry operation on a target memory area of the plurality of memory areas, the memory device to:
   perform a first read retry operation on the target memory area at least one read bias of multiple read biases in a priority read bias group, among a plurality of read biases in a read retry table; and
   perform, according to a result of the first read retry operation, a second read retry operation on the target memory area using one or more remaining read biases, not in the priority read bias group, in the read retry table,
   wherein the read biases in the priority read bias group are selected prior to the remaining read biases when performing the read retry operation on the target memory area, and
   wherein, when performing the first read retry operation, a first read bias in a priority read bias group, used for the first read retry operation, is selected on the basis of the number of times reading data from any one of a plurality of memory areas succeeded during a set time period.

10. The memory controller of claim 9, wherein the control circuit is configured to control the memory device to perform the first read retry operation until reading data from the target memory area succeeds using one of the read biases in the priority read bias group or until reading of data from the target memory area fails for all read biases in the priority read bias group.

11. The memory controller of claim 9, wherein, when performing the first read retry operation, the first read bias is selected on the basis of a time at which reading data from any one of the plurality of memory areas succeeds.

12. The memory controller of claim 9, wherein the control circuit is configured to update information on the priority read bias group on the basis of at least one of results of the first read retry operation and the second read retry operation.

13. The memory controller of claim 12, wherein the control circuit is configured to, when reading data from the target memory area succeeds using a second read bias of the remaining read biases when performing the second read retry operation, add the second read bias to the priority read bias group.

14. The memory controller of claim 13, wherein the control circuit is configured to, when the number of read biases in the priority read bias group exceeds a threshold number of read biases, evict one sacrificial read bias from the priority read bias group.

15. The memory controller of claim 14, wherein the sacrificial read bias is selected on the basis of a time at which reading data from any one of the plurality of memory areas succeeded.

16. The memory controller of claim 14, wherein the sacrificial read bias is selected on the basis of the number of times reading data from any one of the plurality of memory areas succeeded during a set time period.

17. A method for operating a memory system, the method comprising:
  performing a first read retry operation on a target memory area at least one read bias of multiple read biases in a priority read bias group, among a plurality of read biases in a read retry table; and
  performing, according to a result of the first read retry operation, a second read retry operation on the target memory area using one or more remaining read biases, not in the priority read bias group, in the read retry table,
  wherein the read biases in the priority read bias group are selected prior to the remaining read biases when performing the read retry operation on the target memory area, and
  wherein, when performing the first read retry operation, the first read bias in a priority read bias group, used for the first read retry operation, is selected on the basis of the number of times reading data from any one of a plurality of memory areas succeeded during a set time period.

18. The method of claim 17, further comprising updating information on the priority read bias group on the basis of at least one of the results of the first read retry operation and the second read retry operation.

* * * * *